(12) United States Patent
Berry et al.

(10) Patent No.: US 8,893,037 B2
(45) Date of Patent: Nov. 18, 2014

(54) INTERACTIVE AND DYNAMIC MEDICAL VISUALIZATION INTERFACE TOOLS

(71) Applicant: ORCA Health Inc., Sandy, UT (US)

(72) Inventors: Matthew M. Berry, Highland, UT (US); Robert M. Berry, Highland, UT (US); John J. Long, Salt Lake City, UT (US); Dane M. Thurber, Salt Lake City, UT (US)

(73) Assignee: ORCA Health, Inc., Sandy, UT (US)

( * ) Notice: Subject to any disclaimer, the term of this patent is extended or adjusted under 35 U.S.C. 154(b) by 205 days.

(21) Appl. No.: 13/720,196

(22) Filed: Dec. 19, 2012

(65) Prior Publication Data

US 2014/0173508 A1 Jun. 19, 2014

(51) Int. Cl.
  *G06F 3/048* (2013.01)
  *G06F 3/0484* (2013.01)
(52) U.S. Cl.
  CPC .................................. *G06F 3/04847* (2013.01)
  USPC ........................................... 715/794; 715/833
(58) Field of Classification Search
  USPC .................................................. 715/794, 833
  See application file for complete search history.

(56) References Cited

U.S. PATENT DOCUMENTS

| | | | | |
|---|---|---|---|---|
| 5,291,285 A * | 3/1994 | Yokoyama et al. | ........... | 348/180 |
| 5,477,241 A * | 12/1995 | Higgins et al. | ................ | 345/661 |
| 5,491,782 A * | 2/1996 | King et al. | .................... | 715/833 |
| 5,615,347 A * | 3/1997 | Davis et al. | .................... | 715/833 |
| 5,682,488 A * | 10/1997 | Gleason et al. | ............... | 715/833 |
| 5,808,610 A * | 9/1998 | Benson et al. | ................. | 715/788 |
| 5,986,657 A * | 11/1999 | Berteig et al. | ................ | 715/792 |
| 6,012,044 A * | 1/2000 | Maggioncalda et al. | ... | 705/36 R |
| 6,080,925 A * | 6/2000 | Rogers et al. | ............... | 84/485 R |
| 6,240,425 B1 * | 5/2001 | Naughton | ..................... | 701/532 |
| 6,384,591 B1 * | 5/2002 | Estep et al. | .................... | 324/111 |
| 6,542,171 B1 * | 4/2003 | Satou et al. | .................... | 715/833 |
| 7,117,450 B1 * | 10/2006 | Chaudhri | ....................... | 715/787 |
| 7,117,453 B2 * | 10/2006 | Drucker et al. | ............... | 715/833 |
| 7,180,524 B1 * | 2/2007 | Axelrod | ......................... | 345/593 |
| 7,212,998 B1 * | 5/2007 | Muller et al. | ................ | 705/36 R |
| 7,222,308 B2 * | 5/2007 | Sauermann et al. | ........... | 715/833 |
| D567,806 S * | 4/2008 | Viduya et al. | ................. | D14/223 |
| 7,376,469 B2 * | 5/2008 | Eischeid et al. | ................ | 700/17 |
| 7,380,216 B2 * | 5/2008 | Feig et al. | ....................... | 715/786 |
| 2002/0118848 A1 * | 8/2002 | Karpenstein | .................. | 381/119 |
| 2005/0108645 A1 * | 5/2005 | Prentice et al. | ............... | 715/722 |
| 2005/0246647 A1 * | 11/2005 | Beam et al. | .................... | 715/747 |
| 2006/0236248 A1 * | 10/2006 | Eischeid et al. | .............. | 715/751 |
| 2006/0294142 A1 * | 12/2006 | Breedvelt-Schouten et al. | .......................... | 707/104.1 |
| 2007/0143200 A1 * | 6/2007 | Muller et al. | ............... | 705/36 R |

* cited by examiner

*Primary Examiner* — David Phantana Angkool
(74) *Attorney, Agent, or Firm* — Workman Nydegger (57) ABSTRACT

User interfaces facilitate user interaction with virtual representations of anatomical structures that are displayed on computing systems. The user interfaces demonstrably reflect the relative impact of different medical conditions on the anatomical structures. The impact of the medical conditions can be reflected in real-time, as a slider object is manipulated to pull a slide transition screen over the anatomical object. Portions of the anatomical object that become overlapped by the slide transition screens are displayed with dynamic modifications that reflect the impact of the medical conditions associated with the slide transition screens.

20 Claims, 10 Drawing Sheets

INTERACTIVE AND DYNAMIC MEDICAL VISUALIZATION INTERFACE TOOLS

CROSS-REFERENCE TO RELATED APPLICATIONS

Not applicable.

BACKGROUND

1. The Field of the Invention

The present invention is generally related to computing interfaces and, even more particularly, to computing interfaces that are capable of demonstrably reflecting the impact of various medical conditions on anatomical structures dynamically in response to user input.

2. The Relevant Technology

Many computing interfaces and systems are currently configured for providing medical information. However, there is an ongoing need for improved computing interfaces that are dynamically responsive to user input and that are also capable of providing medical information in a user-friendly and intuitive manner.

BRIEF SUMMARY OF THE INVENTION

The present invention extends to improved computing interfaces and methods, systems, and computer program products for utilizing the interfaces to facilitate the manner in which a user can dynamically access medical information.

In some embodiments, a virtual representation of an anatomical structure is modified dynamically in response to user input directed at a control that moves a condition screen over the displayed anatomical structure. In this way, it is possible to demonstrably reflect the impact of a corresponding medical condition on the anatomical structure in a user-friendly and intuitive manner.

In some embodiments, an anatomical structure is initially displayed in a first medical state. The anatomical structure is also displayed with a slide control for a condition screen or a slide transition screen that is associated with a medical condition. In response to the user input directed at the slide control, which is operative to move the condition screen, the condition screen is dynamically moved into a position that overlaps one or more portions of the displayed anatomical structure.

The one or more portions of the anatomical structure that become overlapped by the condition screen are modified in response to the positioning of the condition screen by displaying one or more of the overlapped portions in a second medical state that is different than the first medical state, and so as to thereby dynamically reflect the impact of the medical condition on the anatomical structure.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

User interfaces are utilized in the methods, systems, and computer program products of the present invention for facilitating user interaction with anatomical structures and to dynamically reflect the impact of various conditions on those anatomical structures.

In some embodiments, a virtual representation of an anatomical structure is dynamically modified in response to user input dragging or otherwise moving a transition screen over the displayed anatomical structure in real-time.

Preferably, the anatomical structure is initially displayed in a first medical state along with a slide control corresponding to a slide transition screen that is associated with one or more medical condition. In this regard, the slide transition screen is also understood to be a condition screen.

The anatomical structure can be any vascular, muscular, pulmonary, optic, neurological, skeletal, or other anatomical or biological structure or system, as well as combinations of the foregoing.

In response to the user input directed at the slide control, which is operative to move the slide transition screen, the slide transition screen is dynamically moved into a position that overlaps at least one or more portions of the displayed anatomical structure. One or more portions of the anatomical structure that become overlapped by the slide transition screen are then dynamically modified so that the one or more overlapped portion(s) of the anatomical structure are displayed in a second medical state that is different than the first medical state and that dynamically reflects the impact of the medical condition(s) on the anatomical structure.

In some embodiments, multiple different condition screens correspond to different discrete conditions and the plurality of different condition screens are used simultaneously to further reflect the impact and relationship of multiple different conditions on the displayed anatomical structure(s).

The reflected conditions can be negative (e.g., conditions associated with unhealthy tissues and the presence of diseases or other harmful agents/objects) and they can also be positive (e.g., conditions that are associated with treatments or beneficial agents/objects). In some embodiments, the conditions correspond to discrete stages of treatment, degeneration, passage of time and/or personalized medical records for a patient, diagnosis, or other medical information.

In some embodiments, mobile devices (e.g., phones, tablets, notebook computers, portable gaming device, etc.) are utilized to interact with the user interfaces of the invention. In other embodiments, stationary device (e.g., desktop computers, gaming consoles, televisions, servers, kiosks, etc.) are used.

Preferably, although not necessarily, the consumer devices have touch screens, such as on a tablet computing device, that can be used to receive user input and to display relevant output.

Exemplary Interfaces

Figure 1:
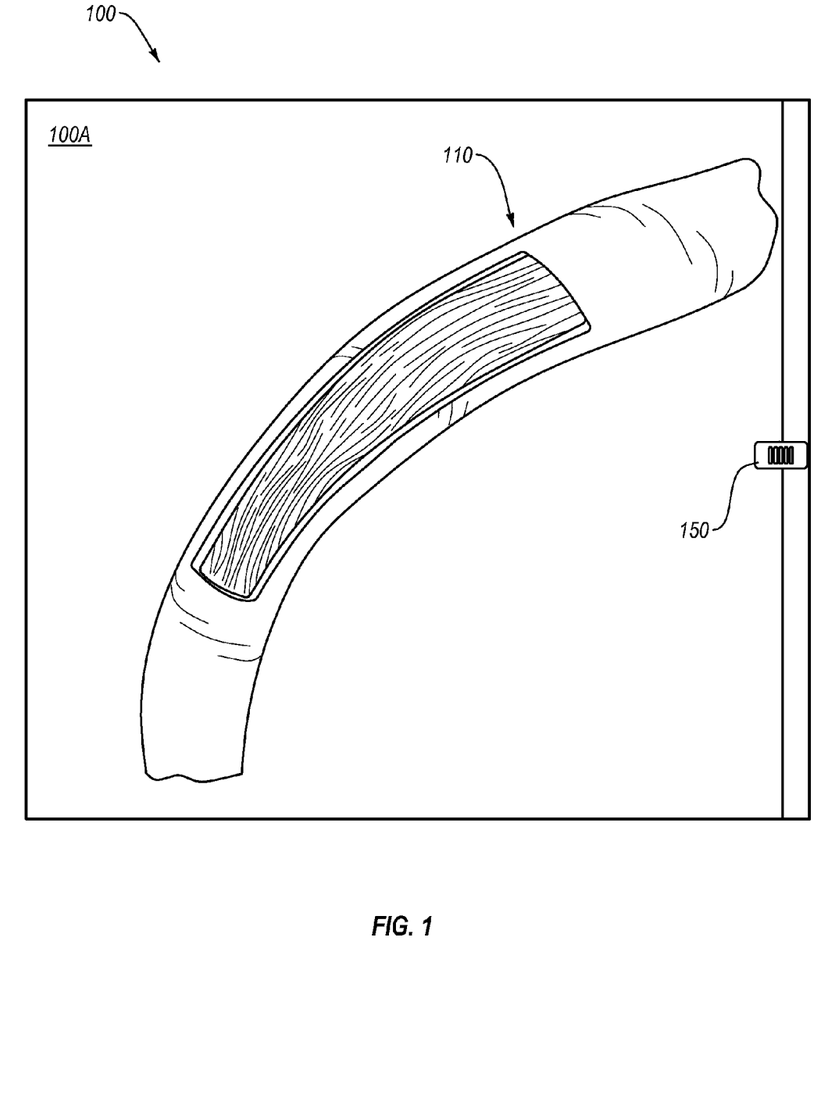
FIG. 1 illustrates one example of a user interface displaying an anatomical structure within a display frame and that is also displayed with a slide control for a slide transition screen that can be selectably pulled over the display frame and displayed anatomical structure via the slide control.

FIG. 1 illustrates one example of a user interface 100 that includes a display frame 100A that is currently displaying an anatomical structure 110. In this embodiment, the anatomical structure 110 is a vein. In other embodiments, however, different anatomical structures are displayed. While only a portion of the vein is presently shown, it will be appreciated that the anatomical structure that is displayed in the display frame 100A can include partial and complete components and systems. Multiple anatomical structures from the same or different systems can also be displayed simultaneously.

As further illustrated, the interface 100 is displayed with a slide control 150 that is associated with a condition screen (also referred to herein as a slide transition screen).

The slide control 150 is configured to operably move (e.g., pull/push) the slide transition screen in response to user input directed at the slide control 150. For instance, according to one embodiment, a user can touch the surface of the display screen where the slide control 150 is displayed and can flick, push, slide, drag or otherwise interact with the slide control 150 to operably cause the slide control to move. In other embodiments, the user interacts with the slide control 150 through a mouse, a function key, a voice command or another input device.

Preferably, the slide transition screen is moved in response to user interaction with the slide control. For instance, as the slide control 150 is moved from right to left on the interface 100, in response to user input, the slide control 150 will pull/push the corresponding slide transition screen with it.

Figure 2A:
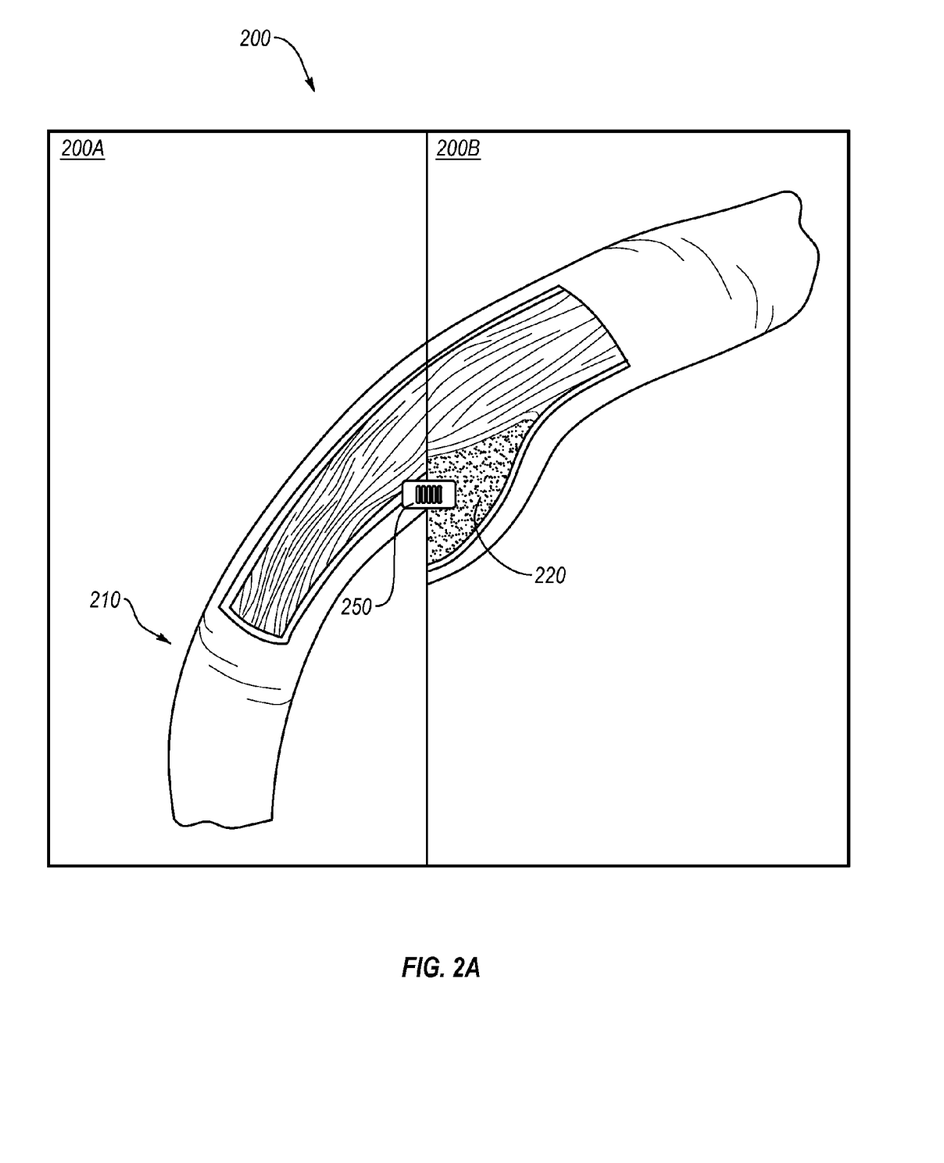
FIG. 2A illustrates another example of a user interface displaying an anatomical structure within a display frame and that is also displayed with a slide transition screen that is positioned to partially overlap with a portion of the display frame and displayed anatomical structure to reflect an impact of a condition associated with the slide transition screen.

FIG. 2A illustrates an interface 200 in which a slide transition screen 200B has been dynamically moved into a position overlapping the display frame 200A and a displayed anatomical structure 210 comprising a vein. The movement of the slide transition screen 200B occurs in direct response to user interaction with the slide control 250.

In some embodiments, the movement of the slide transition screen 200B occurs instantaneously with a functional snap. In other embodiments the movement of the slide transition screen 200B occurs gradually, in real-time, corresponding to the continuous or intermittent input received from the user as the user interacts with the slide control 250.

As shown in FIG. 2, the slide transition screen 200B is associated with a particular condition comprising atherosclerosis, a vascular disease caused by fatty deposits or plaque in the blood vessels.

Notably, as the slide transition screen 200B is moved over the displayed anatomical structure 210, the displayed medical state of the anatomical structure is dynamically changed from an initial healthy state to an unhealthy state to reflect the impact of the condition (atherosclerosis) on the anatomical structure. For instance, as shown, the display of the vein has been modified from the healthy state shown in FIG. 1 to reflect fatty deposits/plaque 220 at some portions of the vein that are now overlapped by the slide transition screen 200B.

By providing a user the ability to controllably move the slide control 250 and slide transition screen 200B over the anatomical structure 210, the user can visibly perceive the impact of a medical condition on different portions of the anatomical structure, on demand, and in real-time. This increased control can greatly enhance the user experience.

Figure 2B:
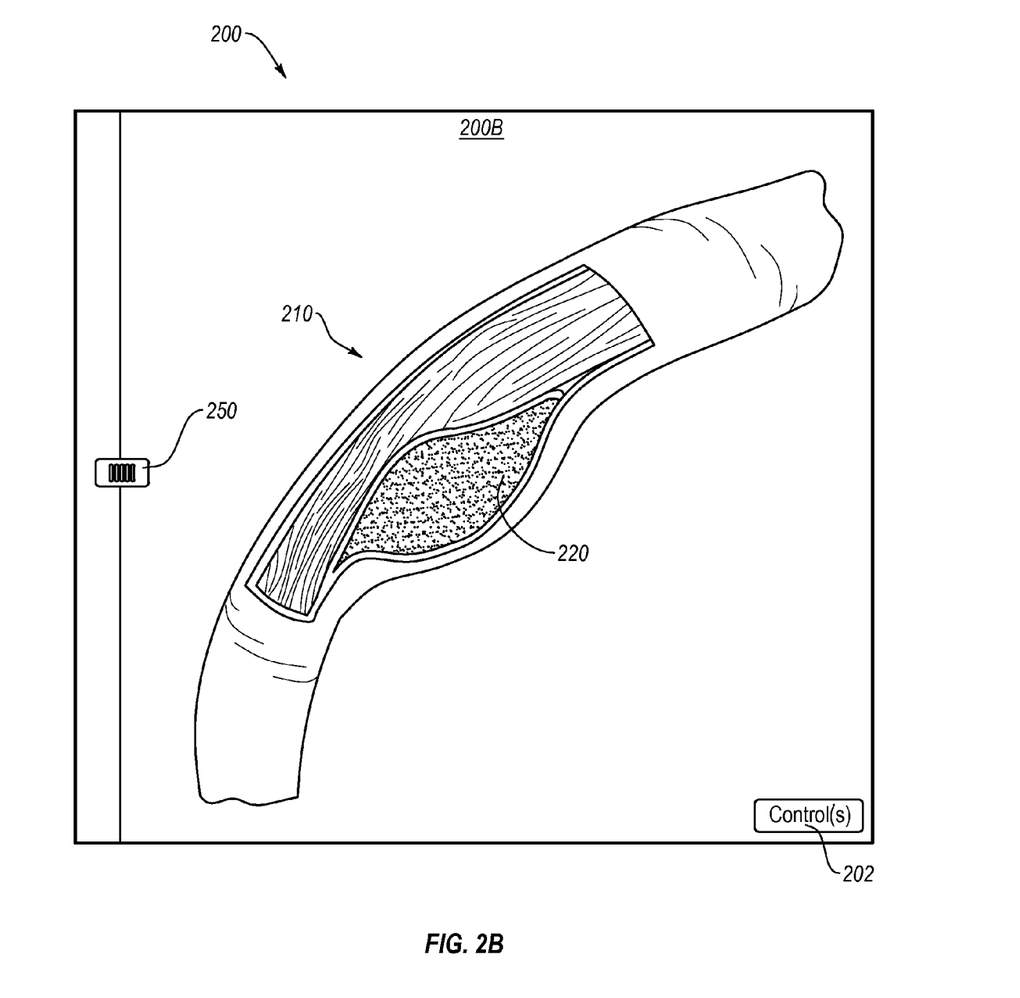
FIG. 2B illustrates another example of a user interface displaying an anatomical structure within a display frame and that is also displayed with a slide transition screen, similar to FIG. 2A, but wherein the slide transition screen fully overlaps with the display frame and anatomical structure.

In the present embodiment, the user can move the control 250 and slide transition screen 200B all the way over to the left, to completely overlap the anatomical structure and display frame 200A (as shown in FIG. 2B), or to any desired location in which the slide transition screen 200B only partially overlaps the anatomical structure (as shown in FIG. 2A). In some embodiments, the slide transition screen 200B can also be removed from overlapping any portion of the anatomical structure or display frame to show the anatomical structure without being impacted by the condition associated with the slide transition screen (as shown in FIG. 1).

In some embodiments, the slide transition screen 200B is snapped into one or more predefined locations that partially or completely overlap the display frame 200A. In other embodiments, there are no predefined locations for positioning the slide transition screen 200B.

As indicated above, FIG. 2B illustrates an embodiment in which the slide transition screen 200B has been positioned entirely overlapping the anatomical structure 210. In this embodiment, many of the overlapped portions of the vein are modified from their initial healthy state (shown in FIG. 1) to an unhealthy state in which plaque/fatty deposits (220) are causing narrowing of the vein.

FIG. 2 also illustrates how different control(s) 202 can be presented to a user to select different anatomical structures to be displayed on the display screen, as well as to select different conditions and/or to selectably adjust a severity associated with the conditions. These controls, when selected, display menus (not shown) with menu options that are selectably operable to select the different anatomical structures, conditions and/or condition severities. In an alternative embodiment, the severity of the condition can be altered by interacting with the slide control (e.g., moving the slide control along the edge of the control screen—up/down for slide controls 150 and 652, for instance, or left/right for slide control 654).

Some of the control(s) 202, when selected, can also be used to identify and select the anatomical structures and/or conditions for a particular patient. In this manner, it is possible to customize the display of the interfaces to demonstrably reflect the modification of a typical or a particular patient's anatomical structure in view of a patient's diagnosed condition and/or another condition as the corresponding slide transition screens are moved back and forth over portions of the anatomical structure(s) that are displayed. For instance, different condition screens can be configured to reflect a particular patient's anatomical structures or diagnosis and/or corresponding annotations associated with the foregoing.

In some embodiments, the control(s) 202, when selected, access and display contact information about one or more specialists associated with the conditions and/or anatomical structures that are currently being presented by the interface. The displayed specialist information can be filtered to correspond to a particular patient's geographical location, insurance coverage, availability and/or other preferred filters.

Figure 3:
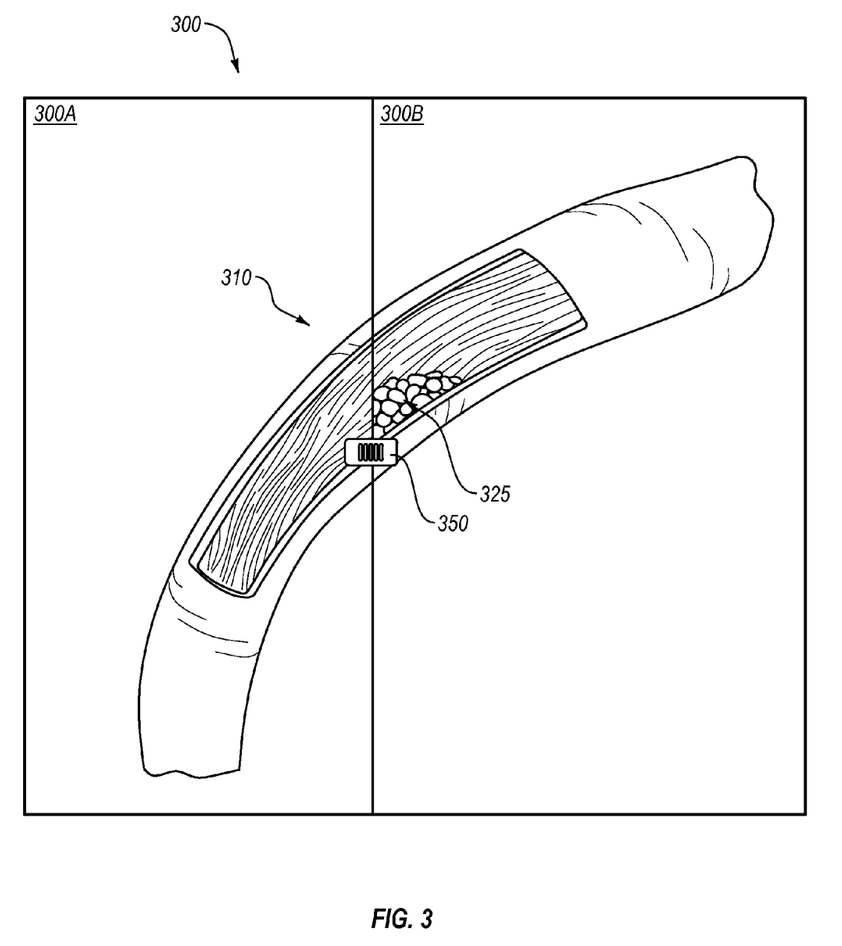
FIG. 3 illustrates another example of a user interface displaying an anatomical structure within a display frame and that is also displayed with a slide transition screen that is positioned to partially overlap with a portion of the display frame and anatomical structure to reflect an impact of a condition associated with the slide transition screen.

FIG. 3 illustrates another example of a user interface 300 displaying an anatomical structure 310 comprising, in this instance, a vein which is displayed within a display frame 300A. In this embodiment, the slide control 350 is connected to a slide transition screen 300B that is associated with a negative blood clotting condition.

In this embodiment, the slide control 350 has been pulled half way across the screen to partially overlap the display frame 300A and the anatomical structure 310. In this embodiment, an overlapped portion of the anatomical structure has been changed from a healthy state (as shown in FIG. 1) to an unhealthy state reflecting the presence of a blood clot 325.

Figure 4:
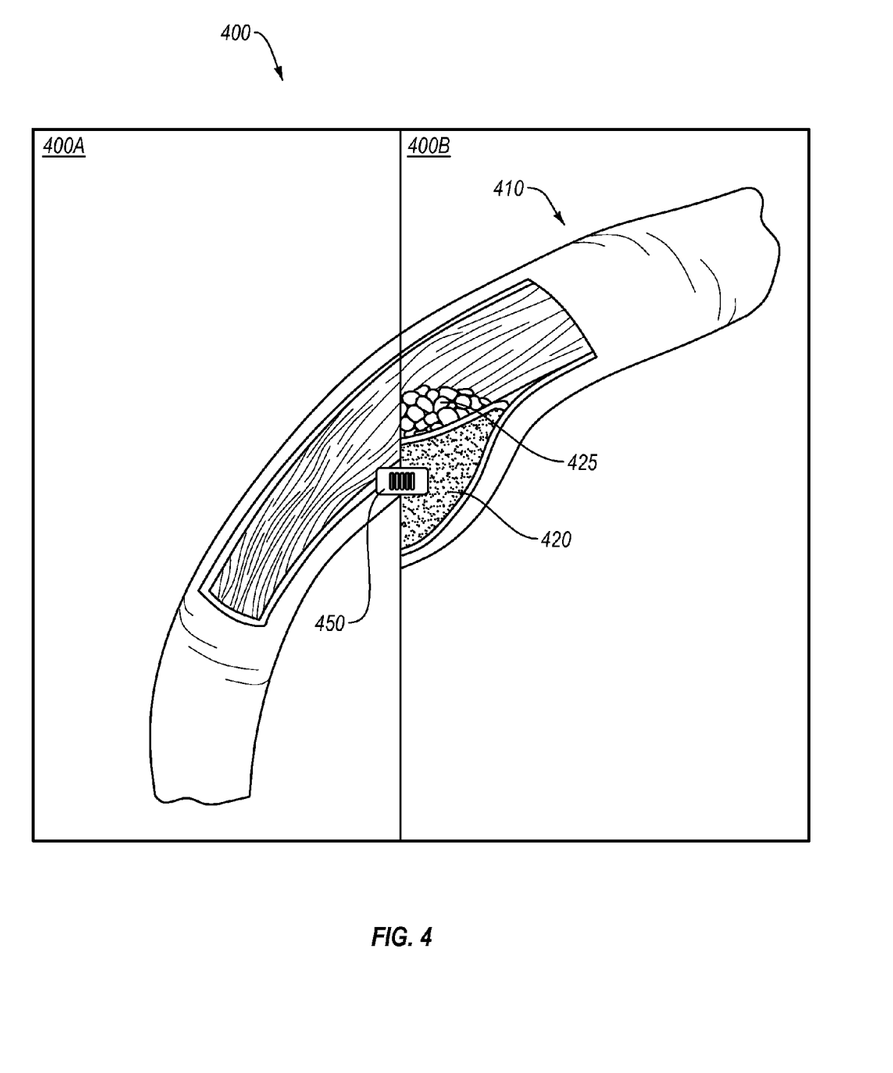
FIG. 4 illustrates another example of a user interface displaying an anatomical structure within a display frame and that is also displayed with a slide transition screen that is positioned to partially overlap with a portion of the display frame and anatomical structure to reflect an impact of multiple conditions associated with the slide transition screen.

FIG. 4 illustrates another example of a user interface 400 displaying an anatomical structure 410 within a display frame 400A. As in FIG. 3, the anatomical structure 410 is partially overlapped by a slide transition screen 400B in response to user interaction with the slide control 450. However, in this embodiment, the single slide transition screen 400B is associated with a plurality of different conditions, namely, atherosclerosis and blood clotting. Accordingly, as shown, one or more of the overlapped portions of anatomical structure 410 have been changed from a healthy state (as shown in FIG. 1) to an unhealthy state reflecting the presence of plaque/fatty tissue 420 as well as a blood clot 325. In this regard, it will be appreciated that any quantity of different conditions can be associated with a single condition screen.

Figure 5:
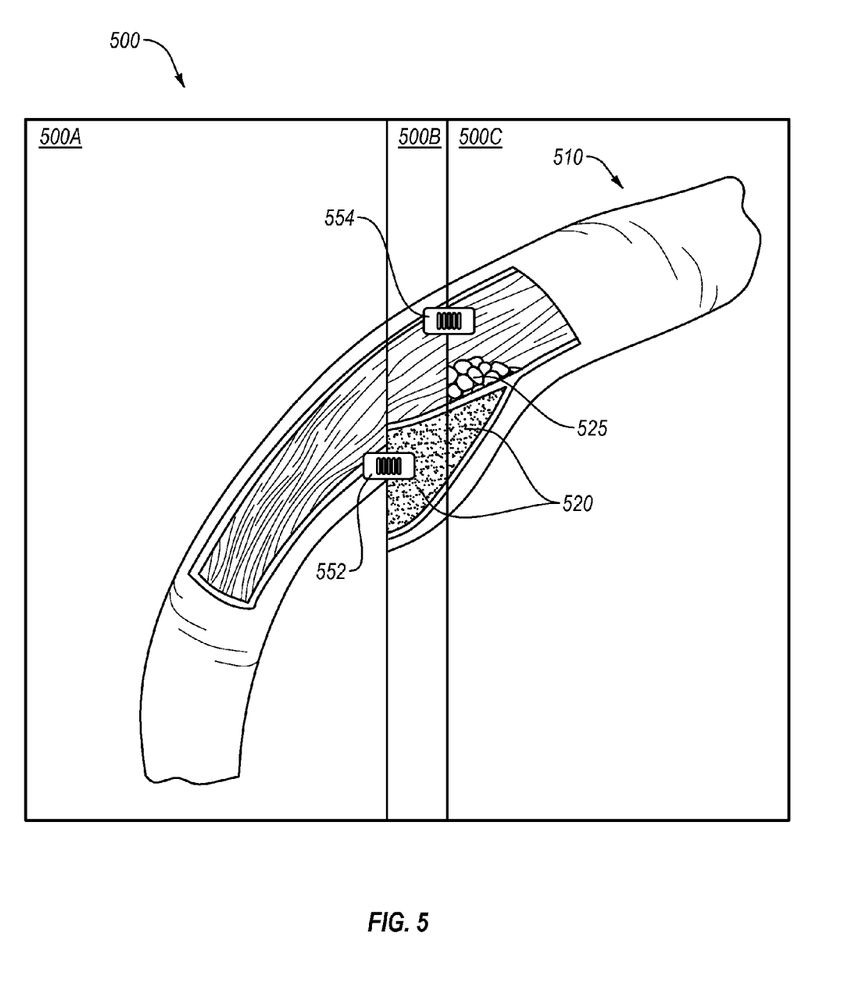
FIG. 5 illustrates another example of a user interface displaying an anatomical structure within a display frame and that is also displayed with a plurality of slide transition screens that partially overlap with a portion of the display frame and anatomical structure to reflect the impact of different conditions associated with the different respective slide transition screens that each move horizontally.

FIG. 5 illustrates another example, similar to that of FIG. 4. However, in this embodiment, the interface 500 includes two different slide transition screens (500B and 500C) that are associated with different corresponding conditions. Currently, the transition screens (500B and 500C) are moved into an overlapping position covering at least part of the display frame 500A and the displayed anatomical structure 510.

Screen 500B was moved into its current placement in response to user input interacting with slide control 522. Similarly, screen 500C was moved into its current placement in response to user input interacting with slide control 554. As currently positioned, the slides 500B and 500C demonstrably reflect the impact of each corresponding condition on the anatomical structure as the slides are dynamically moved into overlapping positions on the illustrated structure, respectively.

For instance, slide 500B is associated with atherosclerosis and its current position (overlapping frame 500A) reflects the impact of the atherosclerosis on the vein. This impact is reflected on-the-fly as the slide (500B) is dynamically moved into its current position.

Slide 500C, on the other hand, is associated with blood clotting. The impact of this condition (blood clotting) is also dynamically reflected on the illustrated vein, which was previously modified to reflect the impact of the atherosclerosis, in response to slide 500C being moved into a placement that overlaps the modified vein shown in display frame 500B and which also overlaps the healthy vein shown in frame 500A.

While the previous examples all shown the slide control screens moving horizontally, from right to left, it will be appreciated that the slides can also move from left to right and vertically (up or down) to provide the described functionality. The slides, if multiple slides are present, can also move in different/perpendicular directions, relative to each other, as generally shown in FIG. 6.

Figure 6:
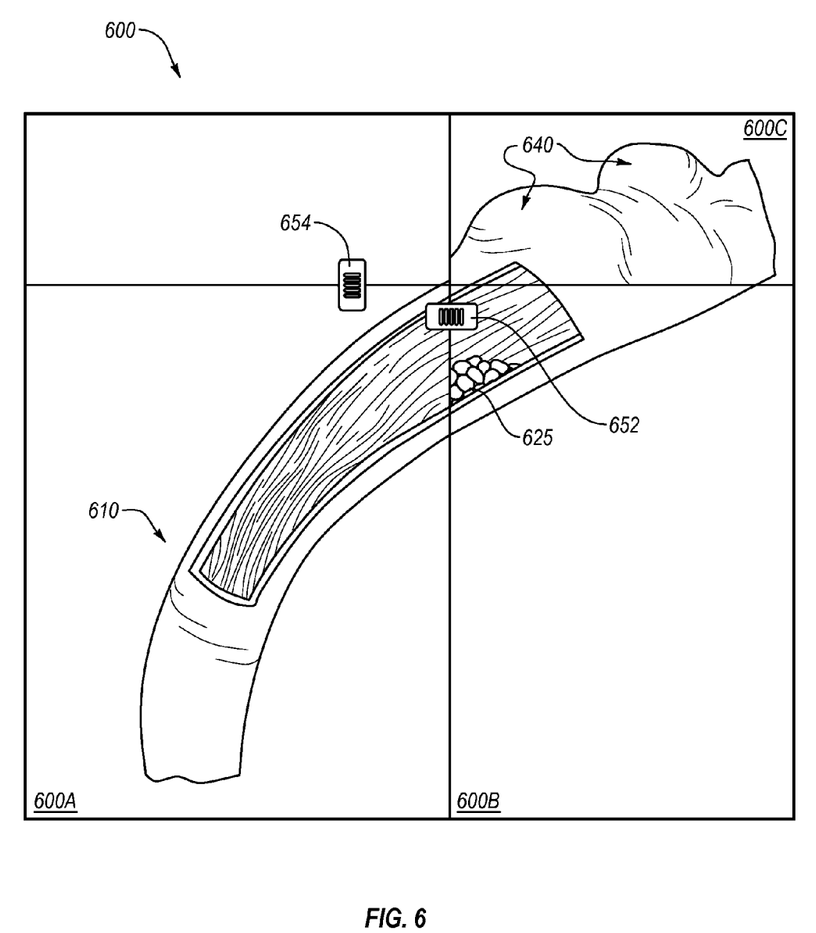
FIG. 6 illustrates another example of a user interface displaying an anatomical structure within a display frame and that is also displayed with a plurality of slide transition screens that partially overlap with a portion of the display frame and anatomical structure to reflect the impact of different conditions associated with the different respective slide transition screens, wherein one slide transition screen moves horizontally and another moves vertically.

FIG. 6 illustrates an example of a user interface 600 displaying an anatomical structure 610 within a display frame 600A which is horizontally overlapped by a condition screen 600B associated with blood clotting, as reflected by blood clot 625. Screen 600B is vertically overlapped by condition screen 600C associated with vericose veins, as reflected by veriscosities 640.

In this embodiment, the impact of each of the conditions (blood clotting and veriscosity) is dynamically reflected in response to the movement of the corresponding condition screens (600B and 600C), respectively, as they are moved. The movement of these screens 600B and 600C is controlled by user interaction with the slide controls 652 and 654.

Figure 7:
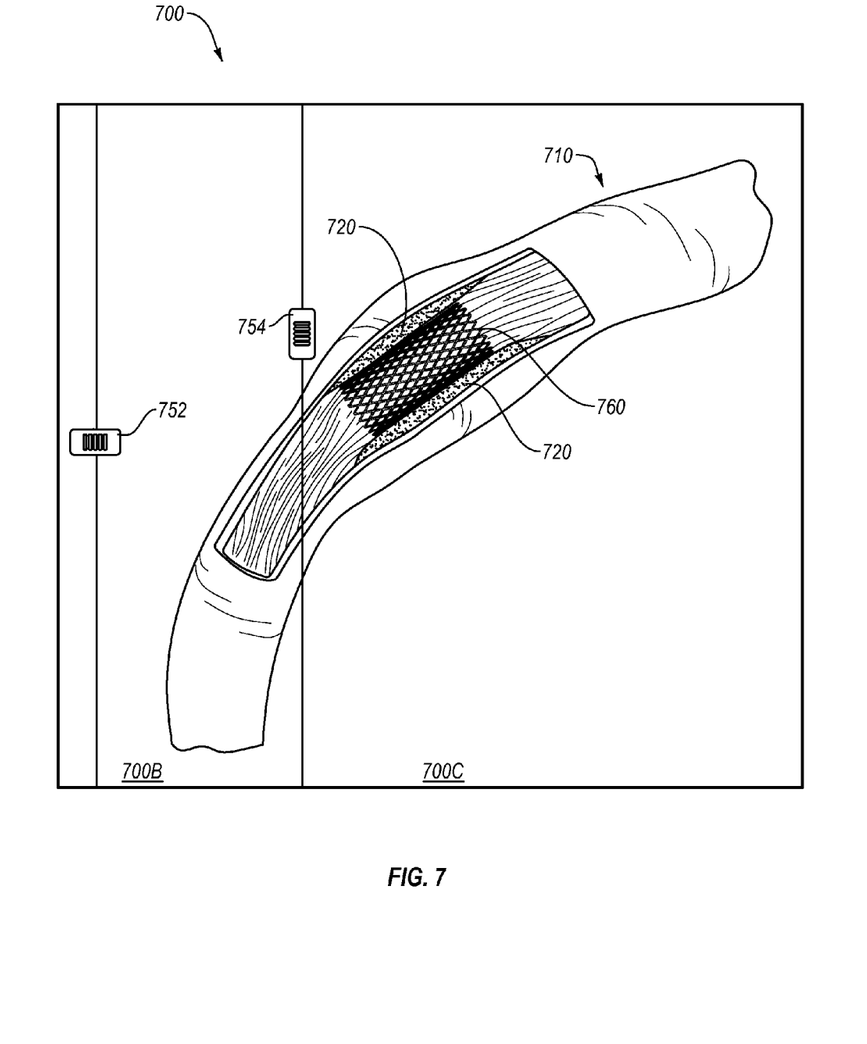
FIG. 7 illustrates another example of a user interface displaying an anatomical structure within a display frame and that is also displayed with a plurality of slide transition screens that overlap an anatomical structure to reflect an impact of the corresponding conditions of the slide transition screens, wherein one display screen is associated with a harmful condition and another display screen is associated with a treatment or beneficial condition.

FIG. 7 reflects another embodiment in which a user interface 700 displays an anatomical structure 710 that is currently overlapped (entirely) by condition screen 700B. Condition screen 700B, which is associated with atherosclerosis, has been positioned into its current placement in direct response to user input directed at the slide control 752. As now positioned, the screen 700B dynamically reflects the impact of the plaque 720 associated with the atherosclerosis on the vein.

This embodiment also includes another condition screen (700C) that is associated with a condition comprising a treatment for atherosclerosis (e.g., angioplasty). In this example, the condition screen 700C has been positioned to overlap the condition screen 700B, as well as the initial display frame (not shown) which has been entirely covered by condition screen 700B. As shown, condition screen 700C has been positioned into its current placement in direct response to user input directed at the corresponding slide control 754.

While positioning the condition screen 700C it is possible to see how the treatment can dynamically affect the anatomical structure (e.g., a plaque blocked vein). In particular, the placement of a stent into the vein can expand the walls of the vein. Although not shown, different condition screens can also be pulled over the anatomical structure to show different corresponding stages of the treatment (e.g., a first screen can show placement of a collapsed stent and another screen can show the subsequent expansion of the stent).

In other embodiments, a plurality of different condition screens can also be used on a single interface to show different stages/progressions/severities of conditions other than treatments.

While various specific examples have been provided, it will be appreciated that many different configurations of the condition screens and slide controls can be provided to utilize the functionality described herein to dynamically show the impact of a condition on an anatomical structure.

Accordingly, by way of example, and not limitation, it will be appreciated that the different slide controls can be configured with different shapes, colors, orientations, sizes and/or other configurations than are explicitly shown. In other words, the slide controls can have shapes other than rectangular (e.g., round, triangular, etc.) and can be larger or smaller than the controls that are shown. They can also be colored (e.g., to correspond to different conditions or stages of a condition). In some embodiments, the slide controls merely comprise an edge of the condition screen and do not appear to be separately distinguished from any other edge portion of the condition screens.

Although not presently shown, it will be appreciated that the different condition screens can also be configured with different coloring, shading, intensities, textures and/or other visual distinctions to further distinguish a condition screen from the display frame and/or another condition screen.

Figure 8:
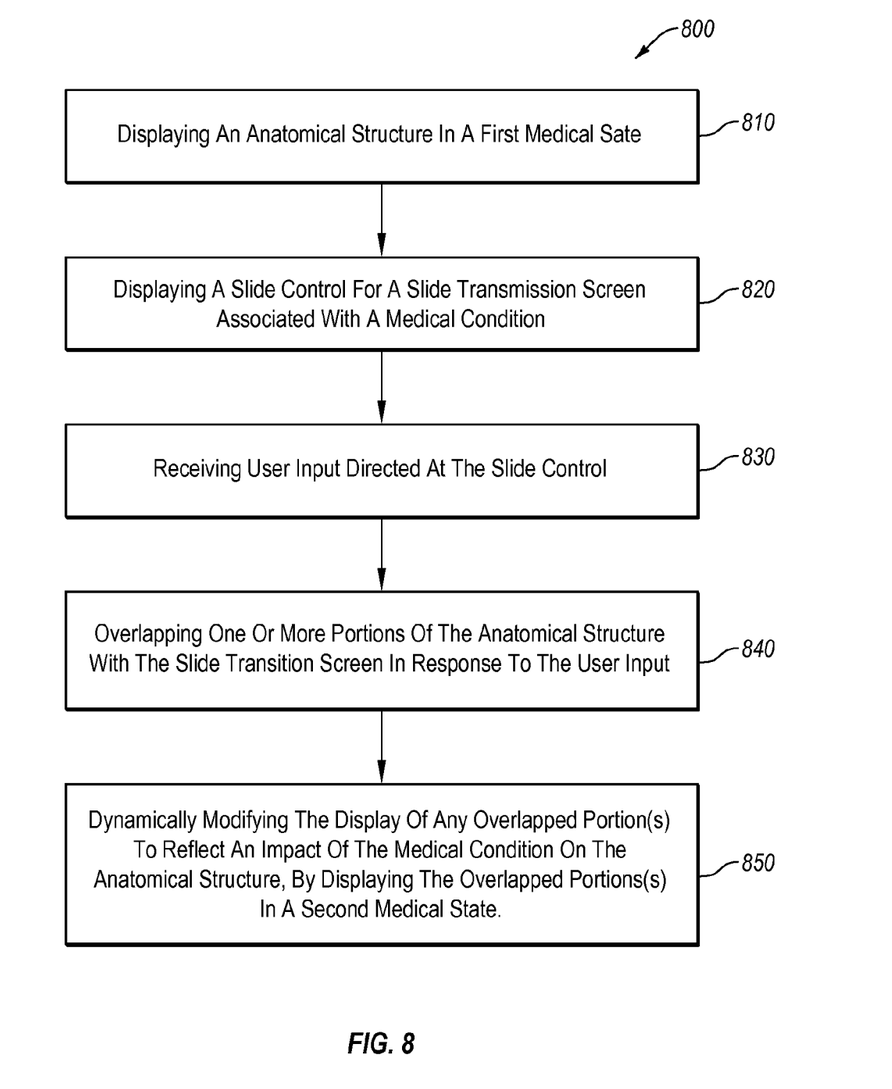
FIG. 8 illustrates a flow diagram of various acts that are associated with certain methods of the invention.

Attention will now be directed to FIG. 8 which illustrates various acts of a flow diagram 800 that are associated with some of the methods of the invention. For instance, methods of the invention can include displaying an anatomical structure in a first medical state on a display frame (810), displaying a slide control for a condition/slide transition screen associated with a medical condition (820), receiving user input directed at the slide transition screen control (830), overlapping one or more portions of the anatomical structure with the slide transition screen in response to the user input (840) and dynamically modifying the display of any overlapped portion(s) to reflect an impact of the medical condition on the anatomical structure, by displaying the overlapped portion(s) in a second medical state (850).

Although not explicitly shown in FIG. 8, the methods of the invention can also include using additional condition screens to further modify the displayed or initially modified anatomical structures in response to moving the additional condition screens to overlap the anatomical structures, as generally described above in reference to FIGS. 5-7.

It will be appreciated that the act of dynamically modifying the display can include blending image data from the condition screen with the image data from the display frame, as well as replacing or augmenting the image data of the display frame with condition screen image data. One or more of these processes can occur dynamically whenever the condition screen is moved over the display frame or another condition screen. Similarly, this modification can include blending, augmenting and/or replacing image data from the display frame and one or more other condition screens, with new condition screen image data whenever a new condition screen is moved over the display frame and the one or more other condition screens.

Computing Environment(s)

Embodiments of the present invention may comprise or utilize special purpose or general-purpose computing devices that include computer hardware, such as, for example, one or more processors and system memory, as discussed in greater detail below. Embodiments within the scope of the present invention also include physical and other computer-readable and recordable type media for storing computer-executable instructions and/or data structures. Such computer-readable recordable media can be any available media that can be accessed by a general purpose or special purpose computer system. Computer-readable media that store computer-executable instructions according to the invention are recordable-type storage media or other physical computer storage media (devices) that are distinguished from merely transitory carrier waves.

Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD-ROM, HD-DVD, BLU-RAY or other optical disk storage, magnetic disk storage or other magnetic storage devices, or any other medium which can be used to store desired program code means in the form of computer-executable instructions or data structures and which can be accessed by a general purpose or special purpose computer and which are recorded on one or more recordable type medium (device).

A "network" is defined as one or more data links or communication channels that enable the transport of electronic data between computer systems and/or modules and/or other electronic devices. When information is transferred or provided over a network or another communications connection or channel (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at one or more processor, cause one or more general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computer system configurations, including, personal computers, desktop computers, laptop/notebook computers, message processors, hand-held devices, multi-processor systems, microprocessor-based or programmable consumer electronics, network PCs, minicomputers, mainframe computers, tablets, mobile telephones, PDAs, pagers, routers, switches, and the like. The invention may also be practiced in distributed and cloud system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 9:
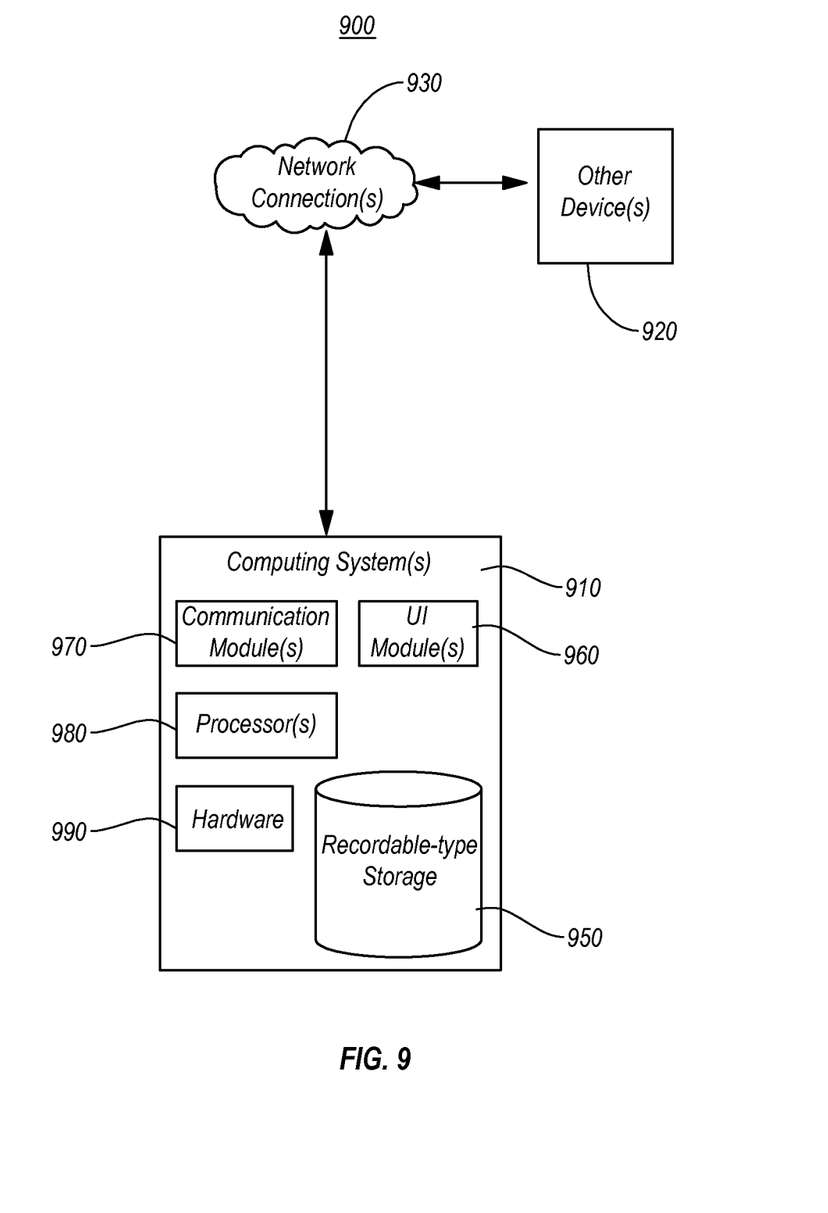
FIG. 9 illustrates one example of a computing environment that can be used to implement aspects of the invention.

FIG. 9 illustrates an exemplary computing environment 900 that can be used to present the user interfaces of the invention, to facilitate user interaction with anatomical structures rendered on the user interfaces, and to demonstrably reflect the impact of various conditions and treatments on those anatomical structures.

As shown, the computing environment 900 includes one or more computing systems 910 in communication with one or more other systems and/or devices 920 through one or more network connections 930. The other systems and devices can be output and input devices, servers, proxies, or any other systems or devices. The network connections 930 can be wired and/or wireless connections and can include any combination of Local Area Network ("LAN") connections, Wide Area Network ("WAN") connections, including the Internet and one or more proxy servers.

As illustrated, the computing system 910 is each configured with a storage 950 that has stored computer-executable instructions for implementing the methods of the invention. The storage 950 can also store medical records, the image data and other medical data that is used by the methods of the inventions for displaying the anatomical structures and conditions described herein.

The storage 950 can also store modules, such as the user interface (UI) module 960 and the communication module 970, which each comprise computer-executable instructions and data structures for implementing aspects of the invention.

The communication module 970, for instance, includes computer-executable instructions that, when executed by one or more processors 980 are operable to facilitate wireless and/or wired communications through the network connections 930 to access or transmit data associated with the interfaces described herein, including the interfaces themselves. The communication modules are also configured to encrypt and decrypt data and to perform authentication of user and system credentials.

The interface module 960 includes computer-executable instructions that, when executed by the one or more processors 980 are operable to generate and/or present the user interfaces described above. Interface module 960 also provides computer-executable instructions that, when executed, are operable to detect and process user input and to perform the functionality described above, such as, but not limited to moving the condition screens in response to user input directed at the slide controls and modifying the display of the anatomical structures by replacing/augmenting and/or blending the display data associated with the different display frames, condition screens and anatomical structures.

The storage 950 can include, but is not limited to non-volatile disk storage and volatile memory. It will also be appreciated that the storage 950 can be distributed among a plurality of different devices or systems, including the other illustrated system(s)/device(s) 920, and does not necessarily need to be constrained to a single physical device. In some embodiments, however, the storage 950 is limited to local storage of the computing system 910.

In some embodiments, the computing system 910 comprises a wireless cell phone, a tablet computer, a notebook computer, a PDA, and/or any other type of smart device having a display screen and/or speakers that are included within the hardware 990 of the mobile device and that are capable of rendering image data, audio data, and/or textual data to a user via the interface modules 960 and 970, for example. In some embodiments, the hardware 990 of the client system 910 also includes a touch screen capable of receiving touch input at the display screen of the client system 910.

The computing systems of the invention can include mobile devices (e.g., phones, tablets, notebook computers, portable gaming device, etc.) and stationary device (e.g., desktop computers, gaming consoles, televisions, servers, kiosks, etc.).

It will be appreciated that the system hardware 990 can include any output device (e.g., display screen, speakers, printer, etc.), as well as any input device (keyboard, mouse, microphone, touchpad, etc.).

Each of the other connected systems/devices 920 also include hardware, processor and storage components similar to those described above with respect to client system 910.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A storage device having stored computer-executable instructions which, when executed by at least one computing processor, implement a method for dynamically modifying a virtual representation of an anatomical structure that is displayed on a display screen of a computing system, the method comprising:

displaying an anatomical structure within a display frame on the display screen, the anatomical structure being displayed in a first medical state;

displaying a slide control for a slide transition screen on the display screen, the slide control being operable to receive user input for responsively moving the slide transition screen over the display frame, the slide transition screen being associated with a medical condition;

receiving user input directed at the slide control that is operative to move the slide transition screen;

in response to the user input, dynamically moving the slide transition screen into a position that overlaps one or more portions of the anatomical structure; and dynamically modifying the display of the one or more portions of the anatomical structure that become overlapped by the slide transition screen, by displaying the one or more portions of the anatomical structure in a second medical state that is different than the first medical state and that reflects an impact of the medical condition on the anatomical structure.

2. The storage device of claim 1, wherein said modifying includes dynamically modifying the display in real-time, while the slide transition screen is being moved into the position that at least partially overlaps the one or more portions of the anatomical structure.

3. The storage device of claim 1, wherein modifying the display includes refraining from modifying any portion of the anatomical structure that is not overlapped by the slide transition screen.

4. The storage device of claim 1, wherein the slide transition screen is hidden from display until the user input is received that directed at the slide control.

5. The storage device of claim 1, wherein the slide transition screen is associated with a medical condition related to the anatomical structure and wherein modifying the display of the anatomical structure includes modifying the one or more portions of the anatomical structure overlapped by the slide transition screen to reflect an impact of the medical condition on the anatomical structure.

6. The storage device recited in claim 5, wherein the method further includes receiving user input designating a severity of the medical condition, the severity of the medical condition being reflected in the modification of the one or more portions of the anatomical structure that is overlapped by the slide transition screen.

7. The storage device recited in claim 6, wherein the method further includes displaying a severity control which is configured to receive user input that is operative to set a severity of the medical condition.

8. The storage device recited in claim 1, wherein the method further includes simultaneously displaying a plurality of slider objects that are each associated with a different slide transition screen.

9. The storage device recited in claim 8, wherein each slide transition screen is associated with a different medical condition.

10. The storage device recited in claim 8, wherein each slide transition screen is associated with a different stage or severity of the medical condition.

11. The storage device recited in claim 1, wherein the display screen is a multi-touch display screen and wherein the user input comprises a slide gesture.

12. The storage device recited in claim 11, wherein the slide gesture causes the slide transition screen to move only while the user input is being received.

13. The storage device recited in claim 11, wherein the slide gesture causes the slide transition screen to continue move even after user input is no longer being received.

14. The storage device recited in claim 11, wherein the slide gesture causes the slide transition screen to snap into a predetermined placement.

15. The storage device recited in claim 14, wherein the predetermined placement is a position in which the slide transition screen overlaps all of the display frame and all of the displayed anatomical structure.

16. The storage device recited in claim 14, wherein the predetermined placement is a position in which the slide transition screen overlaps less than all of the display frame and less than all of the displayed anatomical structure.

17. The storage device recited in claim 1, wherein the method further includes simultaneously displaying a plurality of slider controls that are each associated with different corresponding slide transition screens, each slide transition screen being associated with a different medical condition, and wherein the method includes dynamically modifying any portion of the anatomical structure that becomes overlapped by any of the different slide transition screens to reflect a corresponding impact of the associated medical conditions of any slide transition screen overlapping said any portion of the anatomical structure.

18. The storage device recited in claim 17, wherein the method further includes modifying said any portion of the anatomical structure to reflect an impact of at least two different conditions in response to at least two different slide transition screens being positioned over said any portion of the anatomical structure.

19. A computer implemented method for dynamically modifying a virtual representation of an anatomical structure that is displayed on a display screen of a computing system, the method comprising:
    displaying an anatomical structure within a display frame on the display screen, the anatomical structure being displayed in a first medical state;
    displaying a slide control for a condition screen on the display screen, the slide control being operable to receive user input for responsively moving the condition screen over the display frame, the condition screen being associated with a medical condition;
    receiving user input directed at the slide control that is operative to move the condition screen;
    in response to the user input, dynamically moving the condition screen into a position that overlaps one or more portions of the anatomical structure; and
    dynamically modifying the display of the one or more portions of the anatomical structure that become overlapped by the condition screen, by displaying the one or more portions of the anatomical structure in a second medical state that is different than the first medical state and that reflects an impact of the medical condition on the anatomical structure.

20. A computing device comprising:
    at least one hardware processor; and
    one or more storage device having stored computer-executable instructions which, when executed by at least one hardware processor, implement a method for dynamically modifying a virtual representation of an anatomical structure that is displayed on a display screen associated with the computing device, the method comprising:
        displaying an anatomical structure within a display frame on the display screen, the anatomical structure being displayed in a first medical state;
        displaying a slide control for a slide transition screen on the display screen, the slide control being operable to receive user input for responsively moving the slide transition screen over the display frame, the slide transition screen being associated with a medical condition;
        receiving user input directed at the slide control that is operative to move the slide transition screen;
        in response to the user input, dynamically moving the slide transition screen into a position that overlaps one or more portions of the anatomical structure; and
        dynamically modifying the display of the one or more portions of the anatomical structure that become overlapped by the slide transition screen, by displaying the one or more portions of the anatomical structure in a second medical state that is different than the first medical state and that reflects an impact of the medical condition on the anatomical structure.

* * * * *